(No Model.)

H. C. ANDERSON.
ANIMAL TRAP.

No. 434,751. Patented Aug. 19, 1890.

Witnesses
Samuel Kv.
Wm Bagger

Inventor
Henry C. Anderson
By his Attorneys,
C. A. Snow & Co.

THE NORRIS PETERS CO., PHOTO-LITHO., WASHINGTON, D. C.

UNITED STATES PATENT OFFICE.

HENRY C. ANDERSON, OF WHITESBOROUGH, TEXAS.

ANIMAL-TRAP.

SPECIFICATION forming part of Letters Patent No. 434,751, dated August 19, 1890.

Application filed April 25, 1890. Serial No. 349,525. (No model.)

*To all whom it may concern:*

Be it known that I, HENRY C. ANDERSON, a citizen of the United States, residing at Whitesborough, in the county of Grayson and State of Texas, have invented a new and useful Animal-Trap, of which the following is a specification.

This invention relates to animal-traps; and it has for its object to construct a device of this class which shall be exceedingly simple in construction, and therefore not liable to get out of order, and which at the same time shall be certain and efficient in operation.

With these ends in view the invenion consists in the improved construction and arrangement of parts, which will be hereinafter fully described, and particularly pointed out in the claims.

Figure 1:
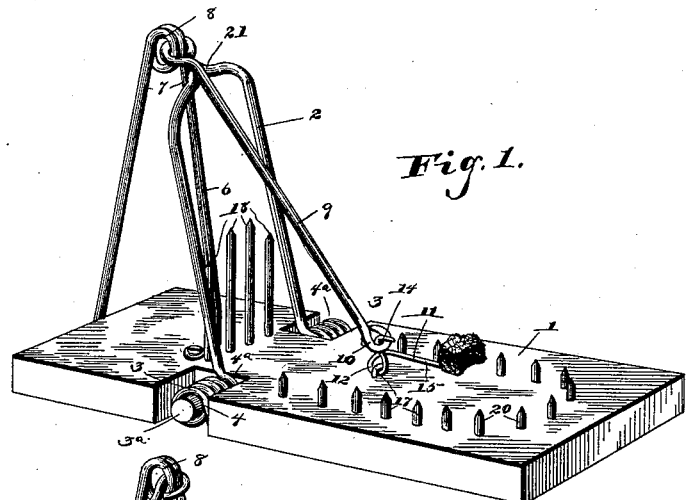
Figure 2:
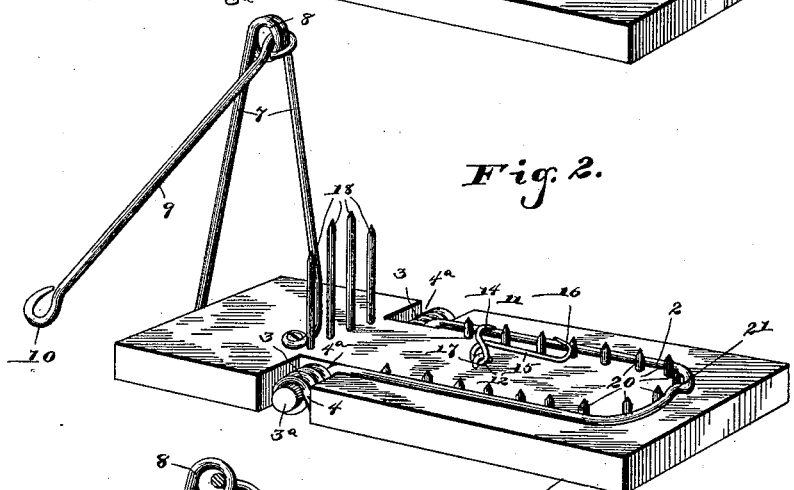
Figure 3:
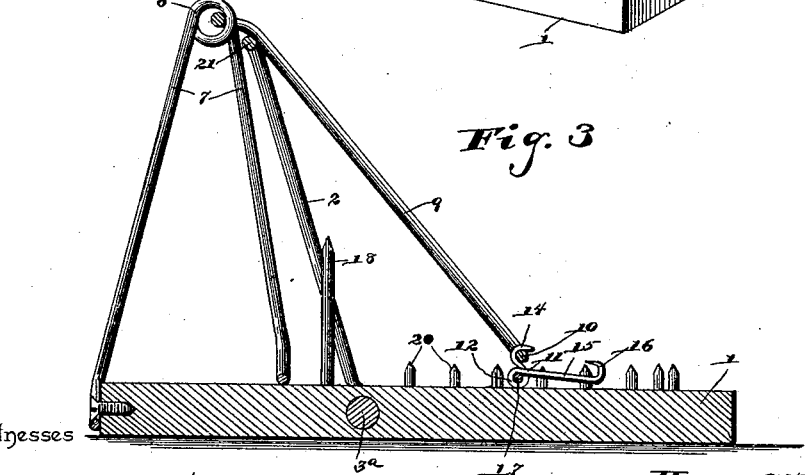

In the drawings hereto annexed, Figure 1 is a perspective view showing my improved trap set and ready for operation. Fig. 2 is a longitudinal sectional view of the same. Fig. 3 is a perspective view showing the trap sprung.

Like numerals of reference indicate like parts in all the figures of the drawings.

I designates the base-board of my improved trap, which may be made of wood or any other suitable material, such as cast-iron, according to the size of the trap and the use to which it is to be put.

2 designates a yoke formed of spring-wire, and provided at its ends with springs, which are coiled upon the ends of a shaft 3ª, extending transversely through the base-board, which latter is provided with opposite recesses 4ª to make room for said spring-coils. The latter terminate in coils 3 3, having arms 4, which rest against the base-board 1, so as to cause the yoke 2 when the trap is sprung to lie flat upon the base-board. 6 designates an upright standard, which is secured to the base-board in rear of the yoke 2. This standard may be constructed of wire, as shown in the drawings hereto annexed, said wire being bent so as to form the legs 7 7, the lower ends of which are suitably secured to the base-board, and the upper ends of which are twisted so as to form the loop 8. Jointed loosely to said loop is a rod 9, the lower end of which is provided with a loop 10.

Suitably secured to the base-board in front of the point of attachment of the yoke 2 is the trigger 11, which consists of a piece of wire bent so as to form the loop 12, the catch 14, and an arm 15, having a hook or point 16. This trigger is preferably attached to the base-board by means of a staple 17, which shall admit of the said trigger being readily manipulated.

Suitably secured to the base-board between the spring-coils of the yoke 2 are a series of pointed guards 18, which are so placed for the purpose of preventing access being had to the bait from in rear of the yoke 2, when the trap might be sprung without effect.

The base-board is provided with a series of upwardly-extending prongs or points 20, located inside of the yoke 2, when the latter occupies the position flat upon the base-board, as in Fig. 2. These prongs serve to impale the victim when the trap is sprung. The outer end of the yoke has a dent 21 to enable it to be readily engaged by the rod 9.

From the foregoing description, taken in connection with the drawings hereto annexed, the operation and advantages of my invention will be readily understood. To set the trap, bait is placed upon the hook or point 16 of the trigger. The yoke 2 is then raised against the tension of the spring-coils 3 to an approximately vertical position. The rod 9 is then passed in front of the said yoke and placed in the dent 21 of the latter, and the loop 10, at the lower end of said rod, is then placed in engagement with the catch 14 of the trigger. When the victim approaches, it will in the effort to dislodge the bait from the trigger spring the trap, and the spring-actuated yoke will descend forcibly upon its neck, impaling it upon the prongs 20. The guards 18 will effectually prevent the victim from springing the trap without being caught.

My improved trap may be made in various sizes and designs for the purpose of alluring and catching various kinds of animals, such as rats, mink, and the like, as well as ducks, geese, and other fowls. The construction of the device is simple in the extreme, and it may be very easily operated with satisfactory results.

Owing to the construction of the rod 9 with the loop 10, the trap may be very conveniently set in the dark, which is very desirable for trapping during the night.

Having thus described my invention, what I claim is—

1. In an animal-trap, the combination of the base-board having the recesses formed in opposite sides thereof, the shaft extending transversely through said base-board and into the said recesses, and the yoke having spring-coils mounted upon the ends of said shaft, substantially as set forth.

2. The combination of the base-board, the spring-actuated yoke, the upright or standard, the trigger-rod jointed loosely to the latter, the trigger connected to the base-board in front of the point of attachment of the yoke, and the prongs or guards arranged in rear of the trigger, substantially as set forth.

3. In an animal-trap, the combination of the base-board having the opposite recesses and the transverse shaft, the yoke having the spring-coils mounted on the projecting ends of the shaft in said recesses, the standard having the holding-rod, the trigger, and the guards or prongs secured in the base-board, substantially as set forth.

In testimony that I claim the foregoing as my own I have hereto affixed my signature in presence of two witnesses.

HENRY C. ANDERSON.

Witnesses:
ADAM F. HORNBACK,
MARCUS M. HEARN.